(12) United States Patent
Lee et al.

(10) Patent No.: US 11,258,501 B2
(45) Date of Patent: Feb. 22, 2022

(54) APPARATUS AND METHOD FOR WIRELESS COMMUNICATION INCLUDING BEAM TRAINING

(71) Applicant: SAMSUNG ELECTRONICS CO., LTD., Suwon-si (KR)

(72) Inventors: Junho Lee, Hwaseong-si (KR); Huiwon Je, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 16/749,641

(22) Filed: Jan. 22, 2020

(65) Prior Publication Data
US 2020/0328794 A1 Oct. 15, 2020

(30) Foreign Application Priority Data

Apr. 12, 2019 (KR) .................. 10-2019-0043298
Jun. 21, 2019 (KR) .................. 10-2019-0074120

(51) Int. Cl.
*H04B 7/06* (2006.01)
*H04B 1/10* (2006.01)
*H04L 25/02* (2006.01)
*H04L 25/03* (2006.01)

(52) U.S. Cl.
CPC ......... *H04B 7/0695* (2013.01); *H04B 1/1027* (2013.01); *H04B 7/0617* (2013.01); *H04L 25/0204* (2013.01); *H04L 25/0242* (2013.01); *H04L 25/03343* (2013.01)

(58) Field of Classification Search
CPC .. H04B 7/0695; H04B 1/1027; H04B 7/0617; H04L 25/0204; H04L 25/0242; H04L 25/03343
See application file for complete search history.

(56) References Cited

U.S. PATENT DOCUMENTS

| | | | |
|---|---|---|---|
| 8,165,595 B2 | 4/2012 | Xia et al. | |
| 8,175,184 B2 | 5/2012 | Kim et al. | |
| 8,351,521 B2 | 1/2013 | Lakkis | |
| 8,498,358 B2 | 7/2013 | Clerckx et al. | |
| 9,287,958 B2 | 3/2016 | Son et al. | |
| 9,414,371 B2 | 8/2016 | Pi et al. | |
| 9,872,296 B2 | 1/2018 | Raghavan et al. | |
| 2005/0096090 A1* | 5/2005 | Nagaraj | H04W 16/28 455/562.1 |
| 2010/0054200 A1* | 3/2010 | Tsai | H04B 7/0632 370/329 |
| 2015/0341105 A1 | 11/2015 | Yu et al. | |
| 2018/0049042 A1* | 2/2018 | Yu | H04W 16/28 |

FOREIGN PATENT DOCUMENTS

KR 10-2002-0010023 A 2/2002

* cited by examiner

*Primary Examiner* — Janice N Tieu
(74) *Attorney, Agent, or Firm* — Sughrue Mion, PLLC

(57) ABSTRACT

A wireless communication method is provided in which beam training phases alternate with data transmission phases. The method includes estimating a first channel based on a signal received using one or more first training beams in a first beam training phase, and calculating, based on the estimated first channel and a first objective function corresponding to the estimated first channel, a first data beam for a first data transmission phase from the one or more first training beams in the first beam training phase, the first data transmission phase following the first beam training phase.

18 Claims, 11 Drawing Sheets

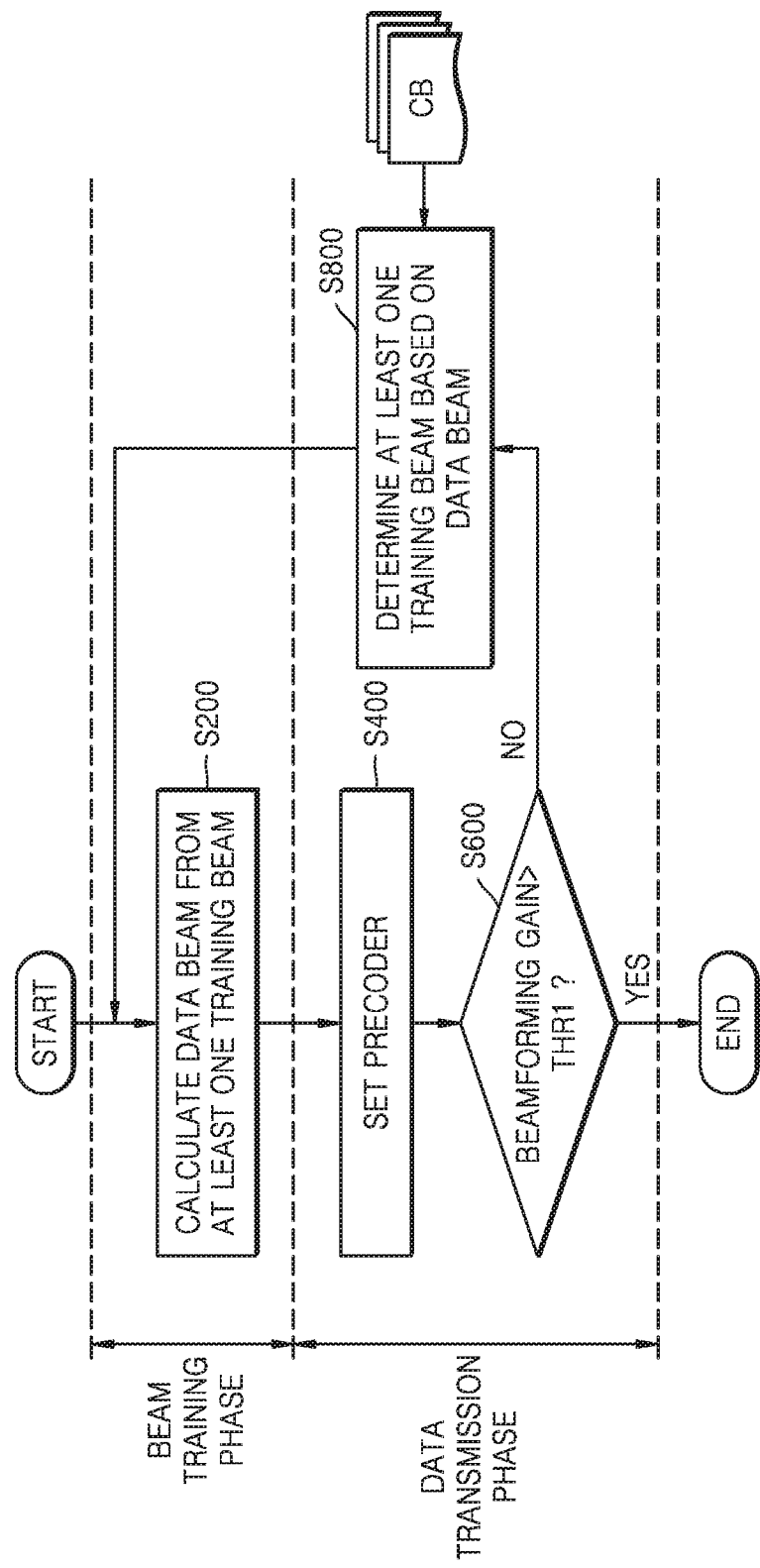

APPARATUS AND METHOD FOR WIRELESS COMMUNICATION INCLUDING BEAM TRAINING

CROSS-REFERENCE TO RELATED APPLICATIONS

This application claims priority from Korean Patent Application No. 10-2019-0043298, filed on Apr. 12, 2019 and Korean Patent Application No. 10-2019-0074120, filed on Jun. 21, 2019, in the Korean Intellectual Property Office, the disclosures of each of which are incorporated by reference herein in their entirety.

BACKGROUND

1. Field

The present disclosure relates to wireless communication, and more particularly, to an apparatus and method for wireless communication including beam training.

2. Description of Related Art

A wide frequency bandwidth may be required for high throughput of wireless communication. For such wideband communication, a millimeter wave (mmWave) frequency band of, for example, at least about 24 GHz may be used. Signals in a high-frequency band like mmWave may be prone to attenuation, and accordingly, beamforming may be used to secure service coverage. Beam training may be performed to align beams of a transmitter and a receiver before transmission of a payload and may be repeated due to a variable wireless communication environment. Therefore, the quality of wireless communication may depend on the accuracy and efficiency of beam training.

SUMMARY

It is an aspect to provide an apparatus and method of efficiently determining an optimal beam in wireless communication.

According to an aspect of an example embodiment, there is provided a wireless communication apparatus including an antenna array; a transceiver configured to provide a signal to the antenna array to form a data beam and configured to process a signal received through the antenna array using the data beam; and a controller configured to calculate the data beam in a beam training phase and to control transmission according to the calculated data beam in a data transmission phase, wherein the controller is configured to estimate a channel using at least one first training beam and calculate the data beam from the at least one first training beam based on the estimated channel and based on an objective function corresponding to the estimated channel, in the beam training phase.

According to another aspect of an example embodiment, there is provided a wireless communication method in which beam training phases alternate with data transmission phases, the wireless communication method comprising estimating a first channel based on a signal received using at least one first training beam in a first beam training phase; and calculating, based on the estimated first channel and a first objective function corresponding to the estimated first channel, a first data beam for a first data transmission phase from the at least one first training beam in the first beam training phase, the first data transmission phase following the first beam training phase.

According to another aspect of an example embodiment, there is provided a wireless communication method in which beam training phases alternate with data transmission phases, the wireless communication method comprising calculating a first data beam for a first data transmission phase from at least one first training beam in a first beam training phase, the first data transmission phase following the first beam training phase; determining at least one second training beam based on the first data beam in a second beam training phase following the first data transmission phase; and calculating a second data beam for a second data transmission phase from the at least one second training beam in the second beam training phase, the second data transmission phase following the second beam training phase.

BRIEF DESCRIPTION OF THE DRAWINGS

Embodiments will be more clearly understood from the following detailed description taken in conjunction with the accompanying drawings in which:

FIG. 4 is a flowchart of a wireless communication method according to an example embodiment;

DETAILED DESCRIPTION

As used herein, the terms "first" and "second" may use corresponding components regardless of importance or order and are used to distinguish one component from another without limiting the components.

Figure 1:
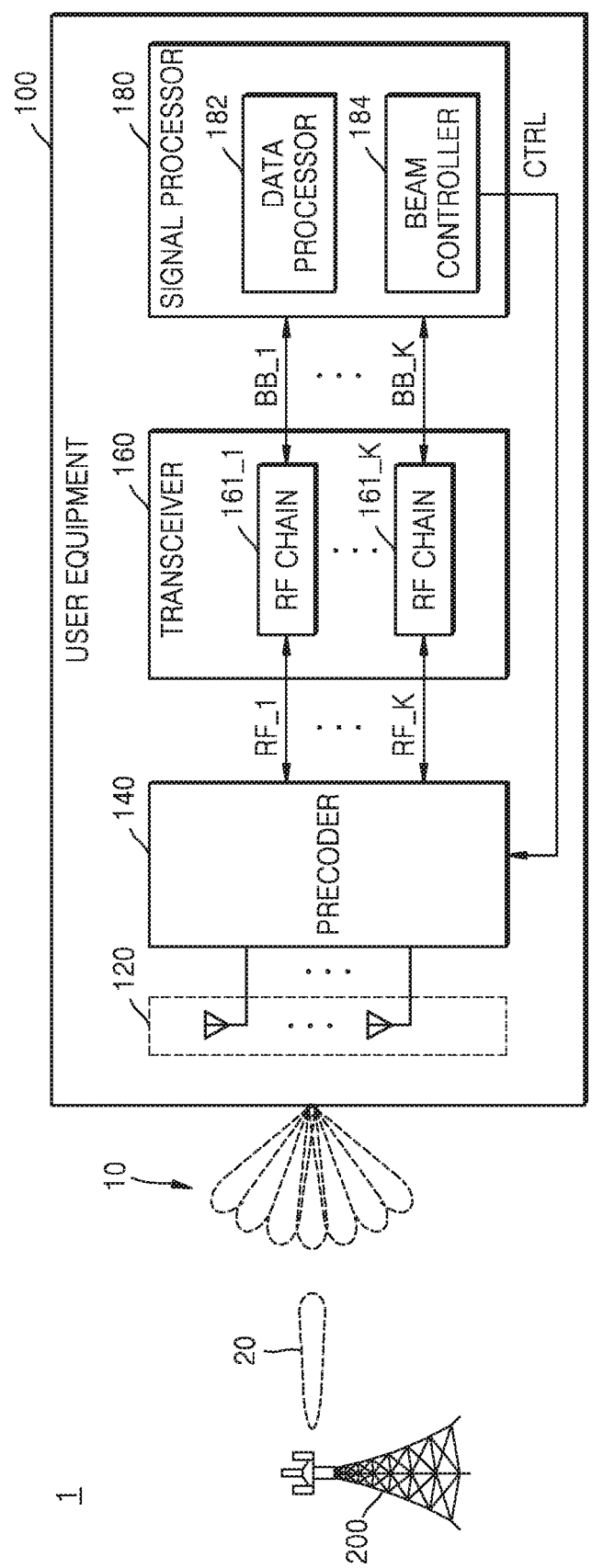
FIG. 1 is a block diagram of a wireless communication system according to an example embodiment.

FIG. 1 is a block diagram of a wireless communication system 1 according to an example embodiment. As shown in FIG. 1, the wireless communication system 1 may include a base station 200 and user equipment 100.

The wireless communication system 1 may include, as a non-limiting example, a fifth generation wireless (5G) system, a long term evolution (LTE) system, an LTE-advanced system, a code division multiple access (CDMA) system, or a global system for mobile communications (GSM) system, using a cellular network, a wireless personal area network (WPAN) system, or another arbitrary wireless communication system. Hereinafter, a wireless communication system using a cellular network will be mainly referred to in the descriptions below, but example embodiments are not limited thereto.

The user equipment 100 may be stationary or mobile as a wireless communication device and may refer to an arbitrary device that may transmit and receive data and/or control information to and from the base station 200 through wireless communication. For example, the user equipment 100 may be referred to as a terminal, terminal equipment, a mobile station (MS), a mobile terminal (MT), a user terminal (UT), a subscriber station (SS), a wireless device, or a portable device. Referring to FIG. 1, the user equipment 100 may include a plurality of antennas 120, a precoder 140, a transceiver 160, and a signal processor 180.

The base station 200 may generally refer to a fixed station that communicates with user equipment and/or another base station and may exchange data and control information with user equipment and/or another base station. The base station 200 may also be referred to as a network access device. For example, the base station 200 may be referred to as a node B, an evolved-node B (eNB), a next generation node B (gNB), a sector, a site, a base transceiver system (BTS), an access point (AP), a relay node, a remote radio head (RRH), a radio unit (RU), or a small cell. In this specification, a base station or a cell may be interpreted as referring to a partial area or function, which is covered by a base station controller (BSC) in CDMA, a node-B in wideband CDMA (WCDMA), an eNB in LTE, a gNB or a sector (or site) in 5G, or the like, in a comprehensive sense and may include various coverage regions, such as a mega cell, a macro cell, a micro cell, a pico cell, a femto cell, a relay node, RRH, RU, and a small-cell communication range.

The user equipment 100 and the base station 200 may perform wireless communication using beamforming, and the wireless communication system 1 may define requirements of the user equipment 100 and the base station 200 for the beamforming. For example, the wireless communication system 1 may use a mmWave frequency band to increase throughput and use beamforming to overcome the path loss of the mmWave. The alignment of beams of the user equipment 100 and the base station 200 may be required for wireless communication using beamforming, and the user equipment 100 and the base station 200 may perform beam training for the beam alignment. For example, as shown in FIG. 1, the base station 200 may repeatedly transmit information (e.g., one symbol) using a transmission beam 20 during beam training, and the user equipment 100 may receive the symbol using different reception beams 10. The user equipment 100 may determine a data beam to be used for wireless communication with the base station 200 based on the reception beams 10, and may provide information about the data beam to the base station 200, and the data beam may be used for wireless communication, i.e., transmission and/or reception of a payload, between the user equipment 100 and the base station 200. In this specification, a beam used in beam training may be referred to as a training beam and a beam used for the transmission and/or reception of a payload as a result of beam training may be referred to as a data beam.

As the wireless communication environment between the user equipment 100 and the base station 200 changes due to the mobility of the user equipment 100, obstacles near at least some of the plurality of antennas 120, or the like, beam training may be frequently performed. Therefore, it may be advantageous to quickly determine an optimal data beam through beam training in the wireless communication system 1. As described below with reference to the drawings, according to various example embodiments, a data beam may not be limited to predefined training beams but may be calculated from at least one training beam in a beam training phase. For example, a channel between the user equipment 100 and the base station 200 may be estimated using at least one training beam, and an optimal data beam calculated based on the estimated channel may be used for wireless communication. A data beam may also be used to determine at least one training beam corresponding to a higher resolution in a subsequent level (described further below), and accordingly, an optimal data beam providing high efficiency (e.g., beamforming gain) may be used for wireless communication. Hereinafter, although description of example embodiments will be focused on the operations of the user equipment 100 determining a training beam and calculating a data beam, it will be understood that, according to other example embodiments, the base station 200 may determine a training beam and calculate a data beam in the same or similar manner.

The user equipment 100 may include the plurality of antennas 120 for beamforming, and the plurality of antennas 120 may be referred to as an antenna array. In some embodiments, the plurality of antennas 120 may include a plurality of sub-arrays respectively forming a plurality of beams. In some embodiments, a sub-array may collectively refer to element antennas included therein and components (e.g., phase shifters) of the precoder 140 that correspond to the element antennas. A sub-array may receive a radio frequency (RF) signal from an RF chain included in the transceiver 160 or transmit an RF signal to the RF chain. When the number of sub-arrays is different from the number of RF chains in the transceiver 160, switches and/or multiplexers may be arranged between the sub-arrays and the RF chains. In this specification, it is assumed that the numbers of sub-arrays and RF chains are K (where K is an integer greater than 1) and thus are the same as each other, but the embodiments are not limited thereto. In some embodiments, the plurality of antennas 120 may be used for spatial diversity, polarization diversity, spatial multiplexing, and so on.

The precoder 140 may provide signals for forming a beam to the plurality of antennas 120 according to a control signal CTRL. In some embodiments, the precoder 140 may include a plurality of phase shifters receiving the control signal CTRL and/or amplifiers, e.g., power amplifiers or low-noise amplifiers, and may be referred to as an analog precoder. For example, as shown in FIG. 1, in a transmission mode, the precoder 140 may receive first through K-th RF signals RF_1 through RF_K from the transceiver 160, amplify the first through K-th RF signals RF_1 through RF_K according to the control signal CTRL, and/or adjust the phases of the first through K-th RF signals RF_1 through RF_K according to the control signal CTRL. In a reception mode, the precoder 140 may generate the first through K-th RF signals RF_1 through RF_K by amplifying signals received through the plurality of antennas 120 according to the control signal CTRL and/or by adjusting the phases of the signals received through the plurality of antennas 120 according to the control signal CTRL.

The transceiver 160 may include first through K-th RF chains 161_1 through 161_K and, in some embodiments, the transceiver 160 may be referred to as an RF integrated circuit (RFIC). An RF chain may refer to a path for independently processing an RF signal and may include, for example, an amplifier, a filter, and/or a mixer. In some embodiments, the RF chain may further include an analog-to-digital converter (ADC) and/or a digital-to-analog converter (DAC). In some embodiments, the transceiver 160 may include switches and/or multiplexers, and the RF chains may be reconfigured by the switches and/or multiplexers. The first through K-th RF chains 161_1 through 161_K may respectively generate the first through K-th RF signals RF_1 through RF_K by respectively processing first through K-th baseband signals BB_1 through BB_K in a transmission mode and may respectively generate the first through K-th baseband signals BB_1 through BB_K by respectively processing the first through K-th RF signals RF_1 through RF_K in a reception mode.

The signal processor 180 may provide the first through K-th baseband signals BB_1 through BB_K to the transceiver 160 and receive the first through K-th baseband signals BB_1 through BB_K from the transceiver 160. The signal processor 180 may be referred to as a communication processor, a baseband processor, or the like and may include logic hardware designed through logic synthesis, and/or may include a central processing unit including a core and software including a series of instructions executed by the core. As shown in FIG. 1, the signal processor 180 may include a data processor 182 and a beam controller 184.

The data processor 182 may generate transmission data including information to be provided to the base station 200 and may generate the first through K-th baseband signals BB_1 through BB_K (or digital signals corresponding to the first through K-th baseband signals BB_1 through BB_K) from the transmission data. In addition, the data processor 182 may generate reception data, which includes information provided by the base station 200, from the first through K-th baseband signals BB_1 through BB_K (or digital signals corresponding to the first through K-th baseband signals BB_1 through BB_K). For example, the data processor 182 may include an encoder, a decoder, a modulator, and/or a demodulator. In some embodiments, the data processor 182 may include a precoder for beamforming, i.e., a digital precoder. Accordingly, the data processor 182 may receive beamforming information from the beam controller 184 and perform precoding based on the beamforming information.

The beam controller 184 may perform a wireless communication method according to an example embodiment and may define beamforming information for a beam formed by the plurality of antennas 120. For example, the beam controller 184 may define beamforming information for a training beam in a beam training phase and generate the control signal CTRL according to the beamforming information. In addition, the beam controller 184 may define beamforming information for a data beam in a data transmission phase and generate the control signal CTRL according to the beamforming information. In some embodiments, when the data processor 182 includes a digital precoder, the beam controller 184 may provide beamforming information to the digital precoder. In this specification, defining beamforming information may simply refer to defining a beam corresponding to the beamforming information, and calculating and determining beamforming information may simply refer to calculating and determining a beam corresponding to the beamforming information. In this specification, the beam controller 184 may be simply referred to as a controller.

Figure 2:
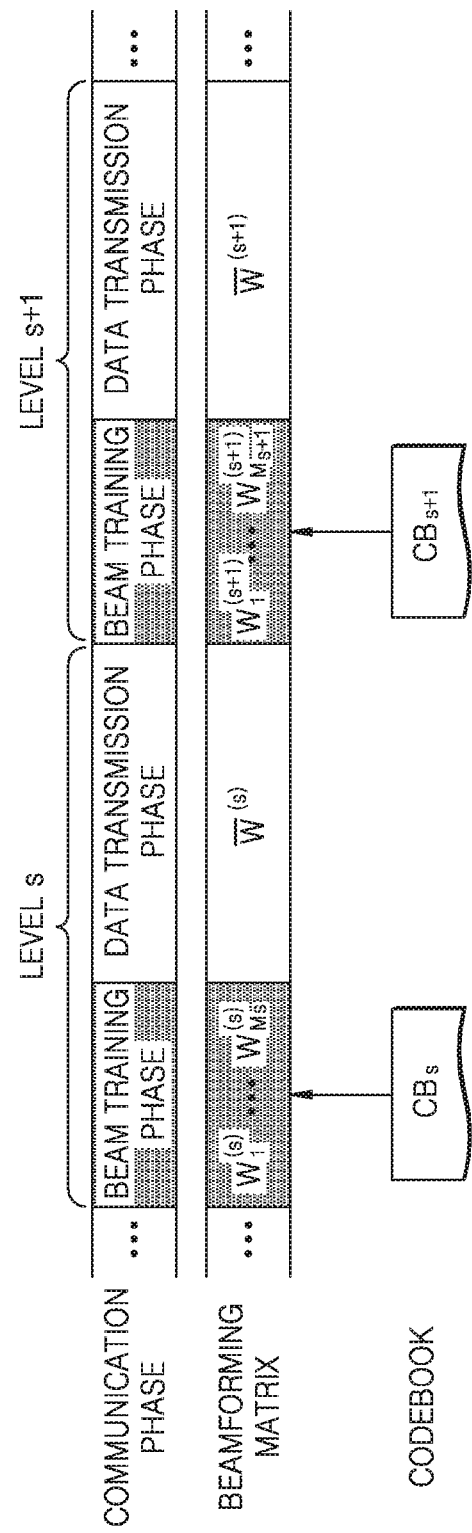
FIG. 2 is a timing diagram illustrating a wireless communication method according to an example embodiment.

FIG. 2 is a timing diagram illustrating a wireless communication method according to an example embodiment. In some embodiments, the wireless communication method of FIG. 2 may be performed by the user equipment 100 illustrated in FIG. 1. FIG. 2 will be described with reference to FIG. 1 below.

In some embodiments, beam training phases alternate with data transmission phases. For example, as shown in FIG. 2, a beam training phase and a data transmission phase may be sequentially performed in a level "s" and a beam training phase and a data transmission phase may be sequentially performed in a next level, i.e., a level "s+1" (where "s" is an integer greater than 0). A pair of a beam training phase and a data transmission phase, in which the data transmission phase uses a data beam defined in the beam training phase, may be referred to as a single level. As described below with reference to FIGS. 3A and 3B, respective beam training phases in sequential levels may be connected with each other. It will be noted that despite the name, the user equipment 100 may operate in a reception mode using a data beam in a data transmission phase.

Referring to FIG. 2, beam training may be performed using $M_s$ training beams in a beam training phase in the level "s", where $M_s$ is an integer greater than 0. In some embodiments, the base station 200 may transmit known training symbols using the transmission beam 20, which is fixed, $M_s$ times. In some embodiments, the transmission beam 20 may be a fixed transmission beam, and the base station 200 may transmit known training symbols Ms times. For example, the base station 200 may transmit unit-symbol channel state information-reference signal (CSI-RS) resources over orthogonal frequency division multiplexing (OFDM) symbols using the transmission beam 20, which is fixed. The user equipment 100 (or the beam controller 184) may receive the known training symbols using the $M_s$ training beams to combine received signals and may define a data beam based on a reception result. The $M_s$ training beams may be determined by training beam matrices $W_1^{(s)} \ldots W_{M_s}^{(s)}$. For example, the beam matrix $W_m^{(s)}$ defining an m-th training beam (where $1 \leq m \leq M_s$) may be given by Equation 1:

$$W_m^{(s)} = \text{diag}(w_{1,m}^{(s)}, \ldots, w_{K,m}^{(s)}) \quad (1)$$

where $w_{k,m}^{(s)}$ may be a training beam vector for a k-th sub-array in the level "s" (where $1 \leq k \leq K$).

The $M_s$ training beams may be defined according to a codebook $CB_s$ of the level "s". A codebook may include predefined training beam matrices, which correspond to training beams formable by the plurality of antennas 120, and/or information defining such training beam matrices. For example, a codebook may include predefined beam vectors corresponding to beams which may be formed by sub-arrays, respectively. In some embodiments, as described below with reference to FIGS. 3A and 3B, a codebook may define training beams having patterns at least partially overlapping each other in one level.

The user equipment 100 may include a plurality of codebooks respectively corresponding to a plurality of levels. As described below with reference to FIGS. 3A and 3B, a codebook corresponding to a higher level among the plurality of levels may have a higher resolution than a codebook corresponding to a lower level among the plurality of levels. For example, a codebook $CB_{s+1}$ for the level "s+1" may have a higher resolution than a codebook $CB_s$ for the level "s", and accordingly, training beams defined by the codebook $CB_{s+1}$ for the level "s+1" may have a pattern (e.g., a main lobe) having a reduced width and stronger orientation as compared to training beams defined by the codebook $CB_s$ for the level "s". Beam training may be performed via a hierarchical search using codebooks having different resolutions. Accordingly, according to various example embodiments, the beam training may be more effectively performed as compared to the case of exhaustive search in which all beam pairs are examined. In this specification, the entire level (or height) of a hierarchical search may be denoted by S, where 1≤s≤S. In this specification, codebooks having different resolutions may be collectively referred to as a multi-resolution codebook.

In some embodiments, training beams may be defined by uniformly or non-uniformly quantizing a region in which a channel direction is available. In some embodiments, a region in which a channel direction is available may be quantized based on statistical characteristics of the channel direction. Directions quantized in the level "s" may be given by Equation 2:

$$\Phi_s = \{\varphi_g : \varphi_g \in [0, 2\pi], g=1, \ldots, G_s\} \quad (2)$$

where $G_s$ may depend on the performance of the precoder 140 (or the performance of a digital precoder when the digital precoder is included) and, for example, on the resolution of a phase shifter. As described above, as the level increases, training beams with a higher resolution may be defined by a codebook. For example, $G_{s+1}$ may be greater than $G_s$ (i.e., $G_{s+1} > G_s$). A training beam group, which includes training beam matrices defining training beams corresponding to the directions quantized in the level "s", may be given by Equation 3:

$$B^{(s)} = [a^T(\varphi_1), \ldots, a^T(\varphi_{G_s})] \quad (3)$$

where a vector a is an array response vector and may include values corresponding to a given direction as elements. In this specification, it may be stated that a training beam group includes training beams.

In some embodiments, a data beam used in a data transmission phase may be calculated from at least one training beam used in a beam training phase in the same level as the data transmission phase. For example, a data beam matrix $\overline{W}^{(s)}$, which defines a data beam used in a data transmission phase in the level "s", may be calculated from training beam matrices $W_1^{(s)} \ldots W_{M_s}^{(s)}$ which define the $M_s$ training beams used in a beam training phase in the level "s". Similarly, a data beam matrix $\overline{W}^{(s+1)}$, which defines a data beam used in a data transmission phase in the level "s+1", may be calculated from training beam matrices $W_1^{(s+1)} \ldots W_{M_s}^{(s+1)}$, which define $M_s$ training beams used in a beam training phase in the level "s+1". In some embodiments, the beam controller 184 may estimate a channel between the user equipment 100 and the base station 200 using at least one training beam and calculate a data beam from the training beam based on the estimated channel. Accordingly, according to various example embodiments, a data beam may not be limited to a training beam defined by a multi-resolution codebook and may provide satisfactory beamforming gain. An example of a method of calculating a data beam from at least one training beam will be described below with reference to FIG. 6.

In some embodiments, at least one training beam used in a beam training phase may be determined from a data beam used in a data transmission phase in a previous level. For example, the training beam matrices $W_1^{(s+1)} \ldots W_{M_s}^{(s+1)}$, which define the $M_{s+1}$ training beams used in the beam training phase in the level "s+1", may be selected from training beam matrices defined by the codebook $CB_{s+1}$ for the level "s+1" based on the data beam matrix $\overline{W}^{(s)}$, which defines a data beam used in the data transmission phase in the level "s". As described above, a data beam that is not limited to training beams may be used, and since a training beam in a subsequent level is selected from the data beam used in a preceding level, the accuracy of a hierarchical search may be increased. As a result, the accuracy and efficiency of beam training may be increased. An example of a method of determining a training beam based on a data beam in a previous level will be described below with reference to FIG. 8.

Figure 3A:
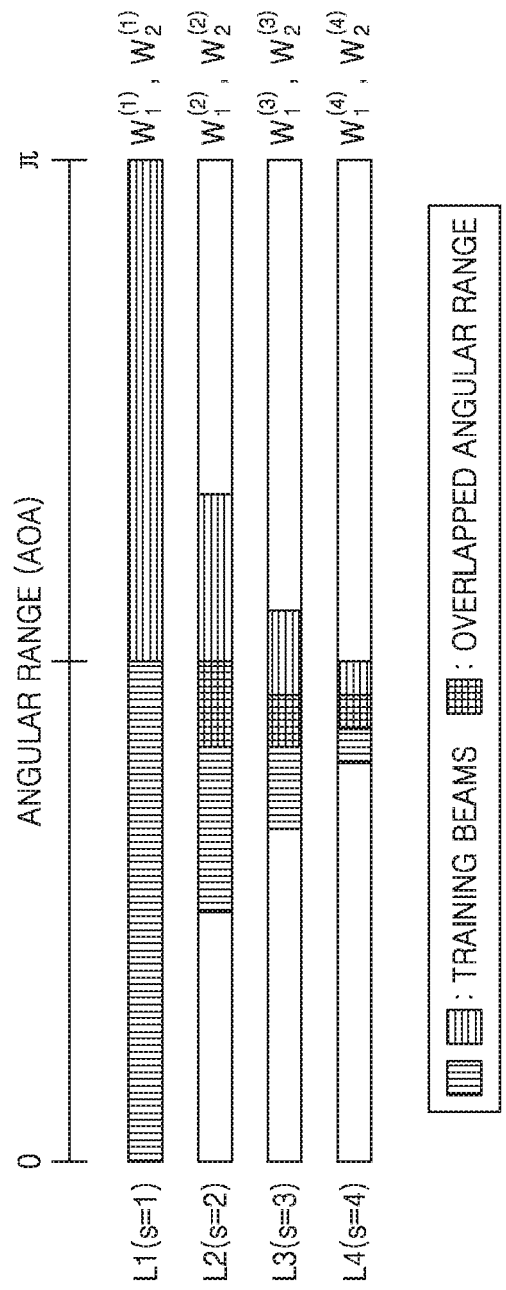
FIGS. 3A and 3B are diagrams illustrating changes in training beams due to beam training, according to an example embodiment.
Figure 3B:
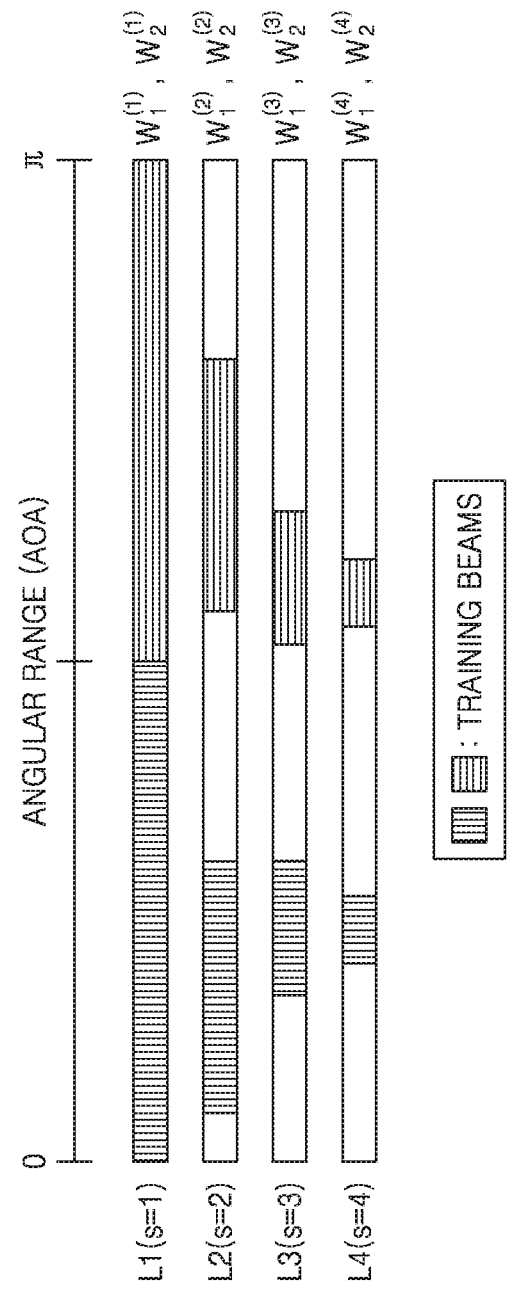

FIGS. 3A and 3B are diagrams illustrating changes in training beams due to beam training, according to an example embodiment. In detail, FIGS. 3A and 3B show angular ranges of training beams in each level, ranging from 0 to a π angle of arrival (AOA). It is assumed that two training beams are used in FIGS. 3A and 3B, that is, $M_s = 2$, and 1≤s≤4. FIGS. 3A and 3B will be described with reference to FIG. 1 and redundant descriptions will be omitted.

Referring to FIG. 3A, when a channel between the user equipment 100 and the base station 200 is formed in one direction, training beams may be gradually aligned in the direction as the level increases. For example, as shown in FIG. 3A, two training beams in a first level L1 may be defined by training beam matrices $W_1^{(1)}$, $W_2^{(1)}$ and, two training beams in a second level L2 may be defined by training beam matrices $W_1^{(2)}$, $W_2^{(2)}$ and, two training beams in a third level L3 may be defined by training beam matrices $W_1^{(2)}$, $W_2^{(2)}$ and, two training beams in a fourth level L4 may be defined by training beam matrices $W_1^{(4)}$, $W_2^{(4)}$. As the level increases, that is, as "s" increases, the angular ranges of training beams may decrease, that is, the training beams may have patterns having decreasing widths, and the training beams may be aligned in the direction of the channel.

In some embodiments, training beams in one level may have patterns at least partially overlapping each other. For example, while training beams defined by the training beam matrices $W_1^{(1)}$, $W_2^{(1)}$ in the first level L1 may have patterns that do not overlap each other, two training beams in each of the second, third and fourth levels L2, L3 and L4 may have patterns at least partially overlapping each other. As described above, when training beams overlapping each other are selected, high-resolution beam alignment may be accomplished even in a relatively low level.

Referring to FIG. 3B, when a channel between the user equipment 100 and the base station 200 is formed in at least two directions, training beams may be gradually aligned in these directions. For example, as shown in FIG. 3B, as the level increases, that is, as "s" increases, the angular ranges of training beams may decrease and training beams in one level may be respectively aligned in different directions.

FIG. 4 is a flowchart of a wireless communication method according to an example embodiment. As described above with reference to FIG. 2, beam training phases alternate with data transmission phases, and the flowchart of FIG. 4 shows an example of an operation of repeating a beam training phase and a data transmission phase until a final data beam is determined. In some embodiments, the method of FIG. 4 may be repeated. For example, operation S600 may be followed by operation S200 in FIG. 4. As shown in FIG. 4, operation S200 may be performed in a beam training phase and operations S400, S600, and S800 may be performed in a data transmission phase. In some embodiments, differently from FIG. 4, operation S800 may be performed in a beam training phase. In some embodiments, the method of FIG. 4 may be performed by the beam controller 184 in FIG. 1 and may be referred to as a method of operating the beam controller 184. FIG. 4 will be described with reference to FIG. 1 below.

A data beam may be calculated from at least one training beam in operation S200. For example, the beam controller 184 may calculate a data beam from at least one training beam, and accordingly, the data beam may not be limited to training beams defined by a codebook. In some embodiments, the beam controller 184 may define an objective function based on an estimated channel and may calculate a data beam that maximizes the objective function. An example of operation S200 will be described with reference to FIG. 6 below.

A precoder may be set in operation S400. For example, the beam controller 184 may provide the control signal CTRL to the precoder 140 such that the data beam calculated in operation S200 in the beam training phase is generated. In some embodiments, as described above with reference to FIG. 1, when the data processor 182 includes a digital precoder, the beam controller 184 may also set the digital precoder. Accordingly, the data beam may be formed by the plurality of antennas 120, and data transmission and reception may be performed using the data beam.

Beamforming gain may be compared with a first threshold value THR1, and it may be determined whether the beamforming gain is greater than the first threshold value THR1 in operation S600. The beamforming gain is a metric value indicating efficiency obtained by a current data beam. A data beam giving a higher beamforming gain may be considered more appropriate and may be referred to as beam gain. For example, the beamforming gain may be defined based on received power obtained from a data beam. The first threshold value THR1 may indicate a beamforming gain for satisfactory wireless communication. Accordingly, when the beamforming gain is higher than the first threshold value THR1, a current data beam may be maintained. However, when the beamforming gain is equal to or lower than the first threshold value THR1, an operation of defining a new data beam will be performed. When the beamforming gain is equal to or lower than the first threshold value THR1, operation S800 may be performed.

At least one training beam may be determined based on the data beam in operation S800. For example, the beam controller 184 may select at least one from a plurality of training beams defined by a codebook CB based on the data beam used in the data transmission phase. In some embodiments, the beam controller 184 may select at least one training beam that may provide performance most similar to the performance of the data beam. An example of operation S800 will be described with reference to FIG. 8 below.

Figure 5:
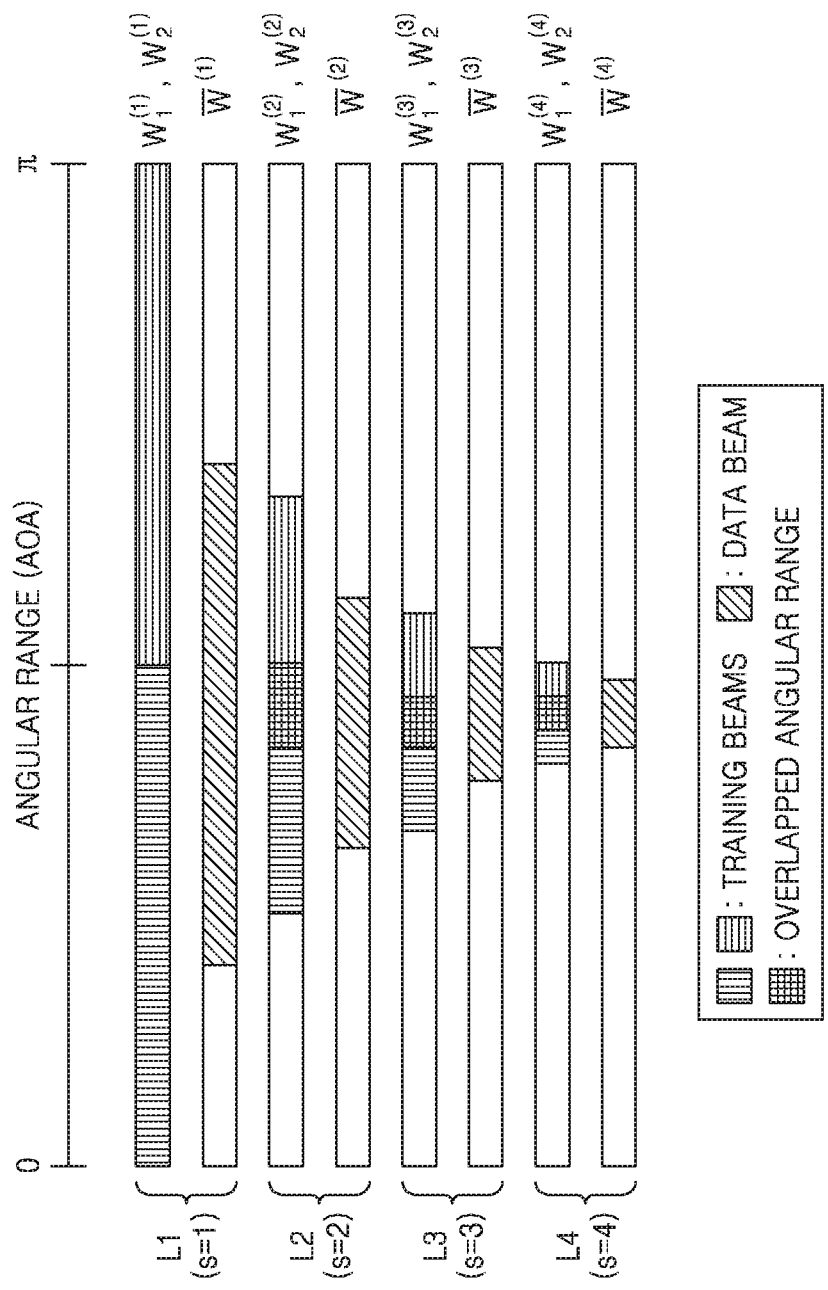
FIG. 5 is a diagram illustrating changes in training beams and a data beam in a wireless communication method, according to an example embodiment.

FIG. 5 is a diagram illustrating changes in training beams and a data beam in a wireless communication method, according to an example embodiment. In detail, FIG. 5 shows angular ranges of training beams and a data beam in each level, ranging from 0 to a π AOA. It is assumed that two training beams are used in FIG. 5, that is, $M_s$=2, and 1≤s≤4. FIG. 5 will be described with reference to FIGS. 1 and 4.

Referring to FIG. 5, as the level increases, that is, as "s" increases, the angular ranges of training beams and a data beam may decrease and the training beams and the data beam may be gradually aligned in a direction in which a channel is formed. For example, in the first level L1, two training beams may be defined by the training beam matrices $W_1^{(1)}$, $W_2^{(1)}$ and a data beam may be defined by a data beam matrix $\overline{W}^{(1)}$, which is calculated from the training beam matrices $W_1^{(1)}$, $W_2^{(1)}$. In the second level L2, two training beams may be defined by the training beam matrices $W_1^{(2)}$, $W_2^{(2)}$, which are selected based on the data beam matrix $\overline{W}^{(1)}$ in the first level L1, and a data beam may be defined by a data beam matrix $\overline{W}^{(2)}$, which is calculated from the training beam matrices $W_1^{(2)}$, $W_2^{(2)}$. In the third level L3, two training beams may be defined by the training beam matrices $W_1^{(3)}$, $W_2^{(3)}$, which are selected based on the data beam matrix $\overline{W}^{(2)}$ in the second level L2, and a data beam may be defined by a data beam matrix $\overline{W}^{(3)}$, which is calculated from the training beam matrices $W_1^{(3)}$, $W_2^{(3)}$. In the fourth level L4, two training beams may be defined by the training beam matrices $W_1^{(4)}$, $W_2^{(4)}$, which are selected based on the data beam matrix $\overline{W}^{(3)}$ in the third level L3, and a data beam may be defined by a data beam matrix $\overline{W}^{(4)}$, which is calculated from the training beam matrices $W_1^{(4)}$, $W_2^{(4)}$.

Figure 6:
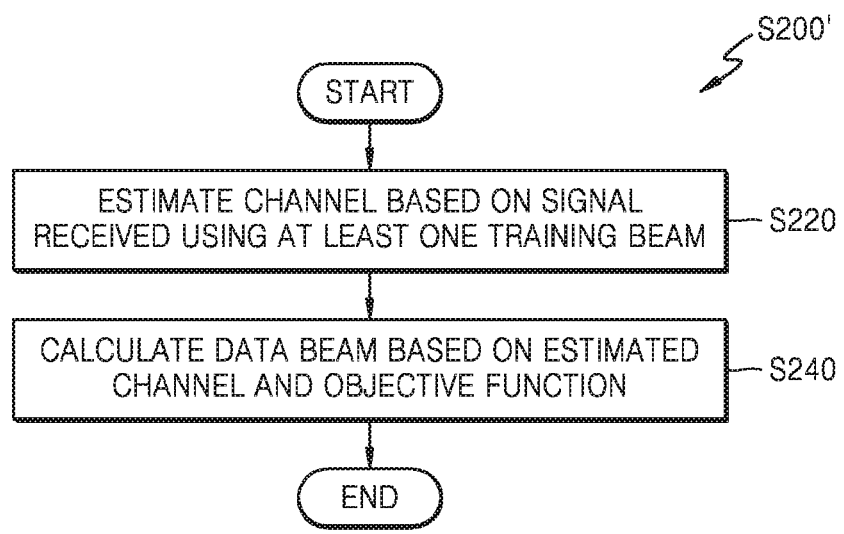
FIG. 6 is a flowchart of a wireless communication method according to an example embodiment.

FIG. 6 is a flowchart of a wireless communication method according to an example embodiment. In detail, the flowchart of FIG. 6 shows an example of operation S200 in FIG. 4. As described above with reference to FIG. 4, a data beam may be calculated from at least one training beam in operation S200' of FIG. 6. As shown in FIG. 6, operation S200' may include operations S220 and S240. Hereinafter, it is assumed that operation S200' is performed in a beam training phase in the level "s". In some embodiments, operation S200' of FIG. 6 may be performed by the beam controller 184 in FIG. 1. FIG. 6 will be described below with reference to FIG. 1

Referring to FIG. 6, a channel may be estimated based on a signal received using at least one training beam in operation S220. For example, the beam controller 184 may estimate a channel based on signals received using $M_s$ training beams, which are defined by the training beam matrices $W_1^{(s)} \ldots W_{M_s}^{(s)}$ in the level "s". An example of operation S220 will be described with reference to FIG. 7 below.

A data beam may be calculated based on the estimated channel and an objective function in operation S240. For example, the beam controller 184 may deduce an objective function based on the estimated channel and may calculate a data beam that maximizes the objective function. The objective function may be variously defined so as to evaluate the efficiency of beamforming. For example, the objective function may be defined from one of, or a combination of at least two selected from, a signal-to-noise ratio (SNR), a signal-to-interference plus noise ratio (SINR), channel capacity, or energy efficiency, which correspond to the estimated channel.

When a matrix of training beams corresponding to the k-th (where 1≤k≤K) sub-array is defined $W_{k,training} = [w_{k,1}^{(s)}, \ldots, w_{k,M_s}^{(s)}]$, the data beam matrix $\overline{W}^{(s)}$ defining a data beam in the level "s" may be given by Equation 4:

$$\overline{W}^{(s)} = \text{diag}(W_{1,training}, \ldots, W_{K,training})C \quad (4)$$

where C is a coefficient matrix and is defined as C=diag $(c_1, \ldots, c_K)$, and $c_k$ may be a vector for the k-th sub-array and may be defined as $c_k = [c_{k,1}, \ldots, c_{k,M_s}]^T$. When a channel matrix indicating the channel estimated in operation S220 is $\overline{H}_{comb}$, an objective function R indicating channel capacity or spectral efficiency may be given by Equation 5:

$$R = |I_{N_{RF}} + \gamma C^H \overline{H}_{comb} \overline{H}_{comb}^H C| \quad (5)$$

where γ may be defined by received power and a transmission beam matrix and will be described with reference to FIG. 7 below. Accordingly, a coefficient matrix $C^{opt}$ that maximizes the objective function may be deduced using Equation 6 below and the data beam matrix $\overline{W}^{(s)}$ finally defining the data beam in the level "s" may be given by Equation 7:

$$C^{opt} = \arg\max_{C} \log_2 \left| I_{N_{RF}} + \gamma C^H H_{comb} H_{comb}^H C \right| \quad (6)$$

$$W^{(s)} = \text{diag}(W_{1,training}, \ldots, W_{K,training}) C^{opt} \quad (7)$$

Figure 7:
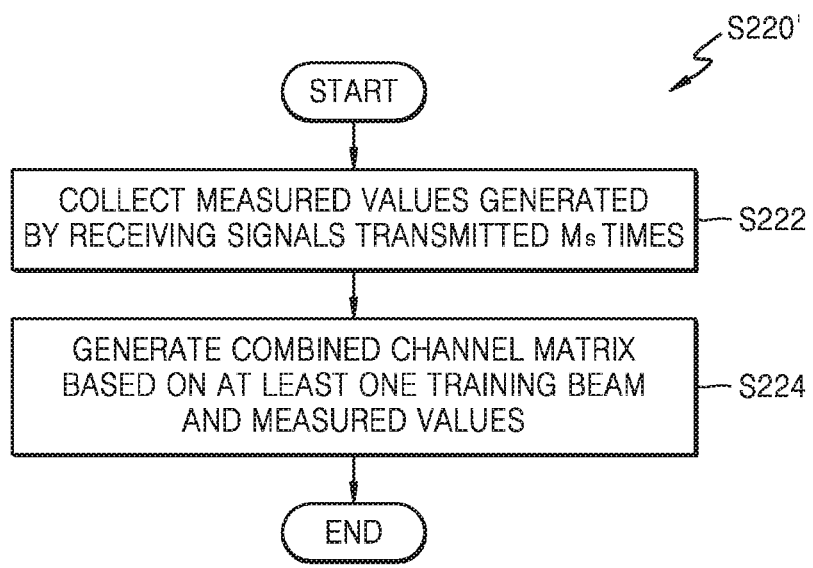
FIG. 7 is a flowchart of a wireless communication method according to an example embodiment.

FIG. 7 is a flowchart of a wireless communication method according to an example embodiment. In detail, the flowchart of FIG. 7 shows an example of operation S220 in FIG. 6. As described above with reference to FIG. 6, a channel may be estimated based on a signal received using at least one training beam in operation S220' of FIG. 7. As shown in FIG. 7, operation S220' may include operations S222 and S224. Hereinafter, it is assumed that operation S220' is performed in a beam training phase in the level "s". In some embodiments, operation S220' of FIG. 7 may be performed by the beam controller 184 in FIG. 1. FIG. 7 will be described below with reference to FIGS. 1 and 6.

Referring to FIG. 7, measured values generated by receiving a signal transmitted $M_s$ times may be collected in operation S222. When a signal is received using the training beam matrix $W_m^{(s)}$ defining the m-th training beam, the received signal may be given by Equation 8:

$$y_m^{(s)} = \sqrt{P}(W_m^{(s)})^H HFx + (W_m^{(s)})^H n_m^{(s)} \quad (8)$$

where P is received power, H is a channel matrix, F is a transmission beam matrix used by the base station 200, "x" is a transmission signal, and $n_m^{(s)}$ is channel noise. The training beam matrix $W_m^{(s)}$ may be given by Equation 1, and accordingly, signals received in the beam training phase in the level "s" may be given by Equation 9:

$$y = \sqrt{P}(W^{(s)})^H HFx + \text{diag}((W_1^{(s)})^H, \ldots, (W_{M_s}^{(s)})^H)$$
$$[n_1, \ldots, n_M]^T \quad (9)$$

A combined channel matrix may be generated based on the at least one training beam and the measured value in operation S224. When the measured values are collected using Equation 9 in operation S222, the combined channel matrix $\overline{H}_{comb}$ indicating the estimated channel may be defined as Equation 10:

$$H_{comb} \triangleq (W^{(s)})^H HF = \text{diag}(W_{1,training}^H, \ldots, W_{K,training}^H) HF \quad (10)$$

As described above with reference to FIG. 6, the objective function may be deduced from the combined channel matrix $\overline{H}_{comb}$, and the data beam matrix $\overline{W}^{(s)}$ that maximizes the objective function may be calculated. For example, the objective function R may be defined as Equation 5 representing channel capacity or spectral efficiency. When the transmission beam matrix F used by the base station 200 is a $N_{gNB} \times N_D$ matrix and the channel noise $n_m^{(s)}$ in Equation 8 is Gaussian noise having a variance $\sigma_n^2$, then y in Equation 5 may be defined as $\gamma = P/(N_D \sigma_n^2)$.

Figure 8:
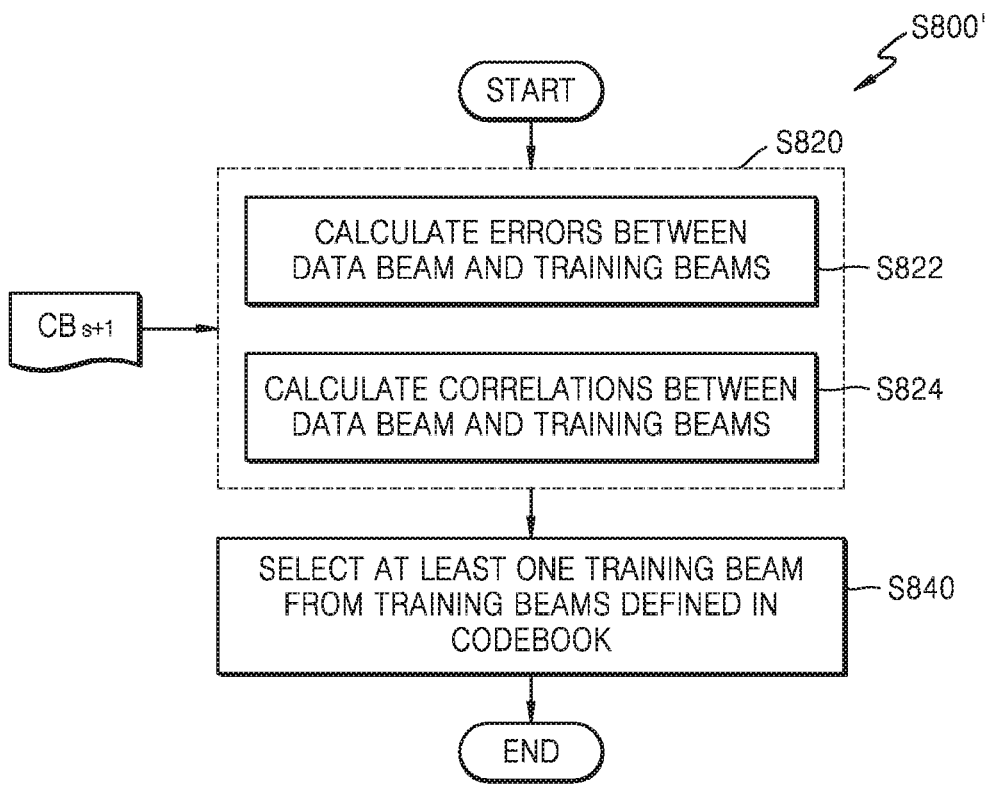
FIG. 8 is a flowchart of a wireless communication method according to an example embodiment.
Figure 9:
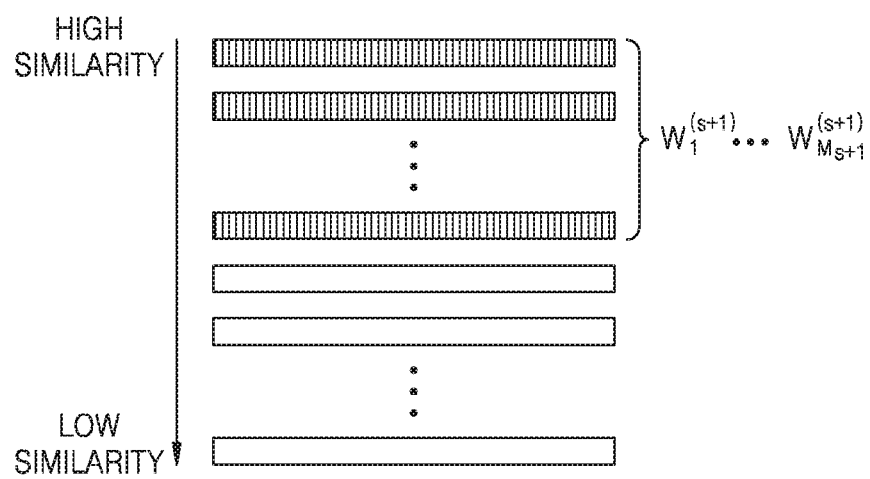
FIG. 9 is a diagram illustrating an operation of selecting a training beam, according to an example embodiment.

FIG. 8 is a flowchart of a wireless communication method according to an example embodiment, and FIG. 9 is a diagram illustrating an operation of selecting a training beam, according to an example embodiment. In detail, the flowchart of FIG. 8 shows an example of operation S800 in FIG. 4, and the diagram of FIG. 9 shows an example of operation S824 in FIG. 8. Hereinafter, it is assumed that the method of FIG. 8 and the operation of FIG. 9 are performed in a beam training phase in the level "s". In some embodiments, the method of FIG. 8 and the operation of FIG. 9 may be performed by the beam controller 184 in FIG. 1. FIGS. 8 and 9 will be described below with reference to FIGS. 1 and 4.

Referring to FIG. 8, as described above with reference to FIG. 4, at least one training beam may be determined based on the data beam in operation S800' of FIG. 8. As shown in FIG. 8, operation S800' may include operations S820 and S840 and operation S820 may include operations S822 and S824.

Similarities between the data beam and a plurality of training beams defined in a codebook may be determined in operation S820. For example, the beam controller 184 may calculate the similarities between the data beam in the level "s" and a plurality of training beams defined in the codebook $CB_{s+1}$ in the level "s+1". As shown in FIG. 8, operation S820 may include operations S822 and S824. In some embodiments, both operations S822 and S824 may be performed, and the similarities may be generated by combining (e.g., performing weighted summation on) results of operation S822, i.e., errors, and results of operation S824, i.e., correlations, respectively. In some embodiments, only operation S822 may be performed, and it may be determined that the lower the error between a training beam and the data beam, is the greater the similarity therebetween. In some embodiments, only operation S824 may be performed, and it may be determined that the higher the correlation between a training beam and the data beam, the higher the similarity therebetween.

An error between the data beam and each of the training beams may be calculated in operation S822. For example, the beam controller 184 may calculate errors between a plurality of training beam matrices defined in the codebook $CB_{s+1}$ in the level "s+1", i.e., elements of a training beam group $B^{(s+1)}$ and the data beam matrix $\overline{W}^{(s)}$ in the level "s". In some embodiments, root mean square errors (RMSEs) between the elements of the training beam group $B^{(s+1)}$ and the data beam matrix $\overline{W}^{(s)}$ may be calculated.

Correlations between the training beam matrices and the data beam may be calculated in operation S824. For example, the beam controller 184 may calculate correlations between the training beam matrices defined in the codebook $CB_{s+1}$ in the level "s+1", i.e., the elements of the training beam group $B^{(s+1)}$, and the data beam matrix $\overline{W}^{(s)}$ in the level "s".

At least one training beam may be selected from the training beams defined in the codebook in operation S840. For example, the beam controller 184 may select $M_{s+1}$ training beam matrices from the training beam matrices defined in the codebook $CB_{s+1}$, i.e., the elements of the training beam group $B^{(s+1)}$, based on the similarities determined in operation S820. Referring to FIG. 9, the elements of the training beam group $B^{(s+1)}$ may be sorted in descending order of the determined similarities, and $M_{s+1}$ training beam matrices $W_1^{(s+1)} \ldots W_{M_s}^{(s+1)}$ including a training beam matrix giving a highest similarity may be selected. In some embodiments, $M_{s+1}$ may be different from $M_s$, as described with reference to FIG. 11 below.

In some embodiments, when the RMSEs between the elements of the training beam group $B^{(s+1)}$ and the data beam matrix are calculated, the RMSEs may be sorted in ascending order and the $M_{s+1}$ training beam matrices $W_1^{(s+1)} \ldots W_{M_{s+1}}^{(s+1)}$ including a training beam matrix giving a lowest RMSE may be selected, using Equation 11:

$$v^{opt} = \arg\min_{v} \|w_k - B^{(s+1)}v\|_2 \quad \text{s.t.} \quad \|v\|_0 = M_{s+1} \quad (11)$$

where v is a $G_{s+1} \times 1$ vector, and $\|v\|_0 = M_{s+1}$ may indicate that v includes non-zero $M_{s+1}$ elements. In some embodiments, when the correlations between the elements of the training beam group $B^{(s+1)}$ and the data beam matrix are calculated, the correlations may be sorted in descending order and $M_{s+1}$ training beam matrices $W_1^{(s+1)} \ldots W_{M_s}^{(s+1)}$ including a training beam matrix giving a highest correlation may be selected.

Figure 10:
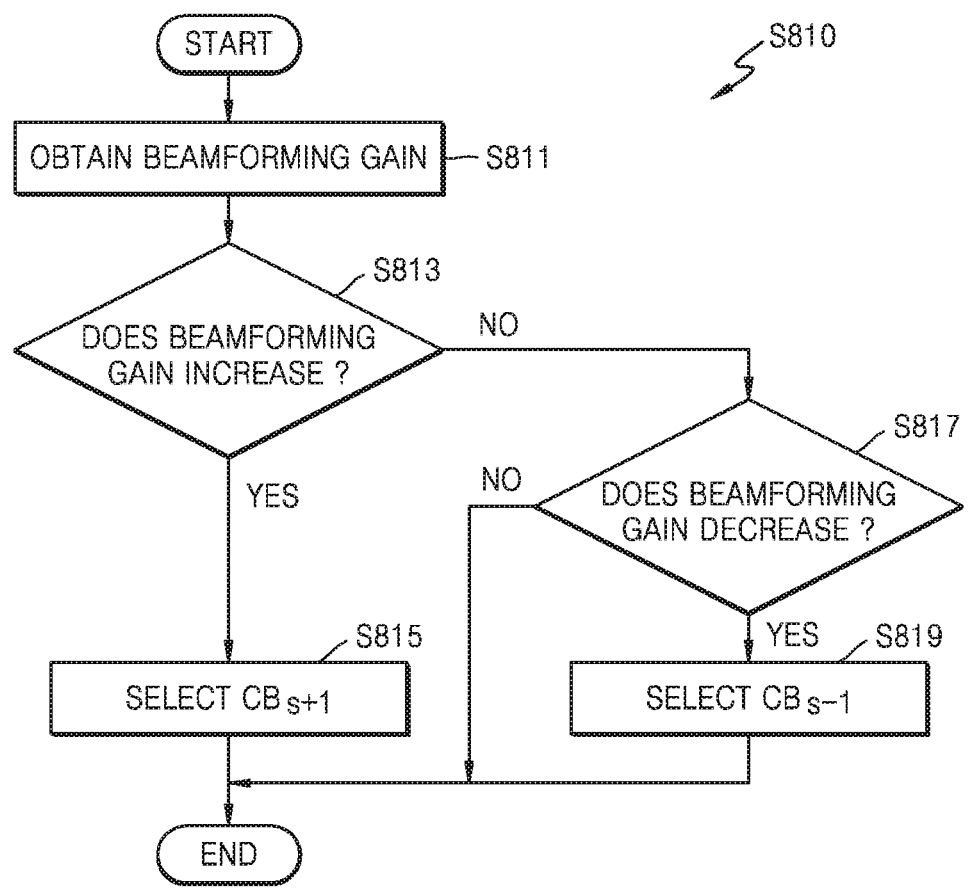
FIG. 10 is a flowchart of a wireless communication method according to an example embodiment.

FIG. 10 is a flowchart of a wireless communication method according to an example embodiment. In detail, FIG. 10 is a flowchart of a method of determining a level in a hierarchical search for beam training. In some embodiments, operation S810 of FIG. 10 may be included in operation S800' of FIG. 8 and performed before operation S820 in FIG. 8. As shown in FIG. 10, operation S810 may include a plurality of operations S811, S813, S815, S817, and S819. Hereinafter, it is assumed that operation S810 is performed in a beam training phase in the level "s". In some embodiments, operation S810 of FIG. 10 may be performed by the beam controller 184 in FIG. 1. FIG. 10 will be described below with reference to FIGS. 1 and 9.

Referring to FIG. 10, beamforming gain may be obtained in operation S811. As described above with reference to FIG. 4, the beamforming gain may be a metric value defined to indicate efficiency obtained by a data beam, and a data beam giving a higher beamforming gain may be considered more appropriate.

Whether the beamforming gain increases may be determined in operation S813. For example, the beam controller 184 may determine whether the beamforming gain obtained in a current level, i.e., the level "s", increases from a beamforming gain obtained in a previous level and may recognize that a hierarchical search is satisfactorily performed when the beamforming gain increases. In some embodiments, the beam controller 184 may determine that the beamforming gain increases when the beamforming gain in the current level increases from the beamforming gain in the previous level at at least a threshold ratio (e.g., a ratio greater than 1) or by at least a threshold magnitude. The threshold ratio may be predefined, and the threshold magnitude may be predefined. As shown in FIG. 10, when the beamforming gain increases (operation S813, YES), operation S815 may be performed. Otherwise, when the beamforming gain does not increase (operation S813, NO), operation S817 may be performed.

When it is determined that the beamforming gain increases in operation S813 (operation S813, YES), the codebook $CB_{s+1}$ of the level "s+1" may be selected in operation S815. As described above with reference to FIG. 2, a codebook corresponding to a higher level may have a higher resolution, and the beam controller 184 may select the codebook $CB_{s+1}$ of the level "s+1", which is higher than the current level, i.e., the level "s", to form a data beam having a higher orientation when the beamforming gain increases.

When it is determined that the beamforming gain does not increase in operation S813 (operation S813, NO), whether the beamforming gain decreases may be determined in operation S817. For example, the beam controller 184 may determine whether the beamforming gain obtained in the current level, i.e., the level "s", decreases from the beamforming gain obtained in the previous level and may recognize that it is not appropriate to use a codebook having a higher resolution when the beamforming gain decreases. In some embodiments, the beam controller 184 may determine that the beamforming gain decreases when the beamforming gain in the current level decreases from the beamforming gain in the previous level at at most a threshold ratio (e.g., a ratio less than 1) or by at least a threshold magnitude. The threshold ratio may be predefined, and the threshold magnitude may be predefined. As shown in FIG. 10, when the beamforming gain decreases (operation S817, YES), operation S819 may be performed. Otherwise, when the beamforming gain does not decrease (operation S817, NO), it may be determined that the beamforming gain is substantially maintained and the codebook of the current level, i.e., the level "s", may be reused.

When it is determined that the beamforming gain decreases in operation S817 (operation S817, YES), a codebook $CB_{s-1}$ of a level "s−1" may be selected in operation S819. As described above with reference to FIG. 2, a codebook corresponding to a lower level may have a lower resolution, and the beam controller 184 may select the codebook $CB_{s-1}$ of the level "s−1", which is lower than the current level, i.e., the level "s", to search for the direction in which the channel is formed in a wider range when the beamforming gain decreases.

Figure 11:
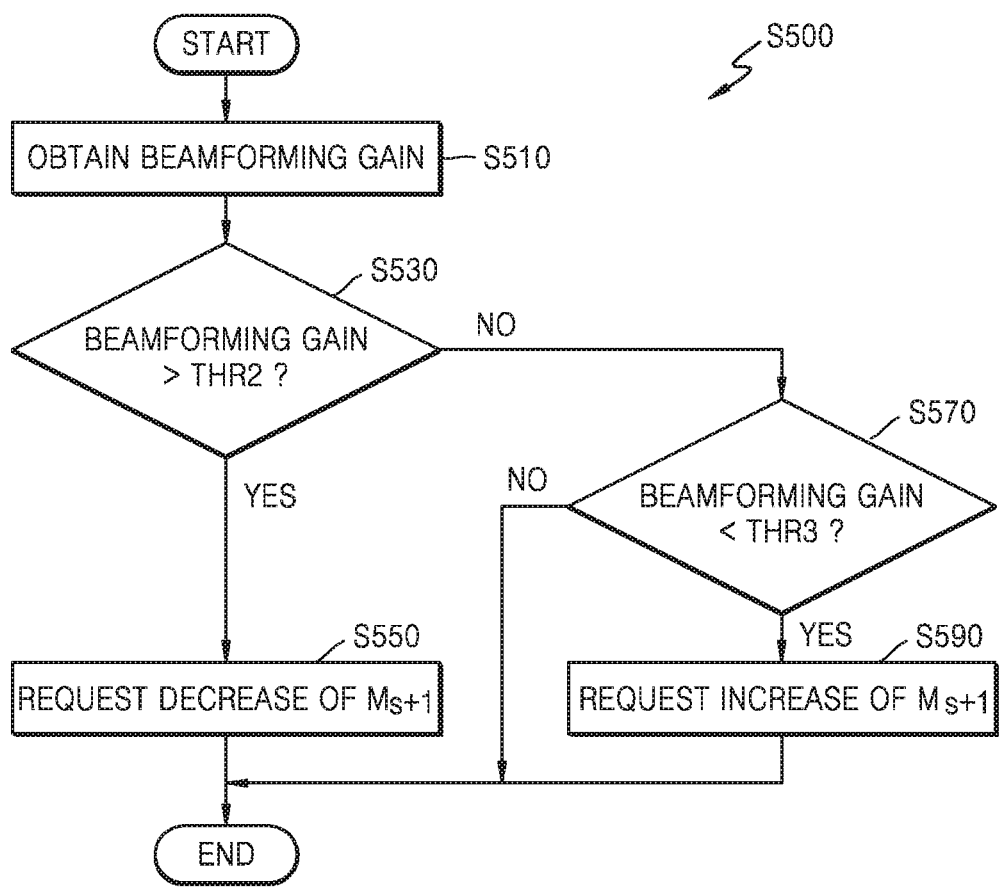
FIG. 11 is a flowchart of a wireless communication method according to an example embodiment.

FIG. 11 is a flowchart of a wireless communication method according to an example embodiment. In detail, FIG. 11 is a flowchart of a method of adaptively adjusting a beam training phase. In some embodiments, operation S500 of FIG. 11 may be included in the wireless communication method of FIG. 4 and may be performed between operations S400 and S600 in FIG. 4. As shown in FIG. 11, operation S500 of FIG. 11 may include operations S510, S530, S550, S570, and S590. Hereinafter, it is assumed that operation S500 is performed in a data transmission phase in the level "s". In some embodiments, operation S500 of FIG. 11 may be performed by the beam controller 184 in FIG. 1. FIG. 11 will be described below with reference to FIGS. 1 and 4.

Referring to FIG. 11, beamforming gain may be obtained in operation S510. As described above with reference to FIG. 4, the beamforming gain may be a metric value defined to indicate efficiency obtained by a data beam, and a data beam giving a higher beamforming gain may be considered more appropriate. As described below, a beam training phase may be reduced or expanded based on beamforming gain. For example, when a beam training phase in the level "s+1" is reduced as compared to a beam training phase in the level "s", the number of training beams used in the beam training phase may decrease (i.e., $M_{s+1} < M_s$). Contrarily, when the beam training phase in the level "s+1" is expanded as compared to the beam training phase in the level "s", the number of training beams used in the beam training phase may increase (i.e., $M_{s+1} > M_s$).

The beamforming gain may be compared with a second threshold value THR2, and it may be determined whether the beamforming gain is greater than the second threshold value THR2 in operation S530. The second threshold value THR2 may indicate a sufficient beamforming gain allowing a following beam training phase to be reduced. In some embodiments, the second threshold value THR2 may be greater than the first threshold value THR1 in FIG. 4. Accordingly, when the beamforming gain is greater than the second threshold value THR2 (operation S530, YES), the following beam training phase may be reduced. As shown in FIG. 11, when the beamforming gain is greater than the second threshold value THR2 (operation S530, YES), operation S550 may be performed. Otherwise, when the beamforming gain is not greater than the second threshold value THR2 (operation S530, NO), operation S570 may be performed.

When it is determined that the beamforming gain is greater than the second threshold value THR2 (operation S530, YES), a decrease of $M_{s+1}$ may be requested in operation S550. For example, the beam controller 184 may request the base station 200 to decrease $M_{s+1}$ to reduce the beam training phase of the level "s+1" following the current level "s". The beam controller 184 may provide information to the data processor 182 such that a request for the decrease of $M_{s+1}$ is included in transmission data. In some embodiments, the beam controller 184 may include a decrement of $M_{s-1}$ in the request. The base station 200 may reduce a phase, in which known symbols for beam training are transmitted, in the level "s+1" in response to the request.

Otherwise, when it is determined that the beamforming gain is not greater than the second threshold value THR2 (operation S530, NO), the beamforming gain may be compared with a third threshold value THR3, and it may be determined whether the beamforming gain is less than the third threshold value THR3 in operation S570. The third threshold value THR3 may indicate an insufficient beamforming gain requiring expansion of a following beam training phase. In some embodiments, the third threshold value THR3 may be less than the first threshold value THR1 in FIG. 4. Accordingly, when the beamforming gain is less than the third threshold value THR3 (operation S570, YES), the following beam training phase may be expanded. As shown in FIG. 11, when the beamforming gain is not less than the third threshold value THR3 (operation S570, NO), operation S500 may end. Accordingly, the number of training beams used in the beam training phase in the level "s+1" may be the same as the number of training beams used in the beam training phase in the level "s" (i.e., $M_{s+1}=M_s$). Otherwise, when the beamforming gain is less than the third threshold value THR3 (operation S570, YES), operation S590 may be performed.

An increase of $M_{s+1}$ may be requested in operation S590. For example, the beam controller 184 may request the base station 200 to increase $M_{s+1}$ to expand the beam training phase in the level "s+1" following the current level "s". The beam controller 184 may provide information to the data processor 182 such that a request for the increase of $M_{s+1}$ is included in transmission data. In some embodiments, the beam controller 184 may include an increment of $M_{s+1}$ in the request. The base station 200 may expand a phase, in which known symbols for beam training are transmitted, in the level "s+1" in response to the request.

Figure 12A:
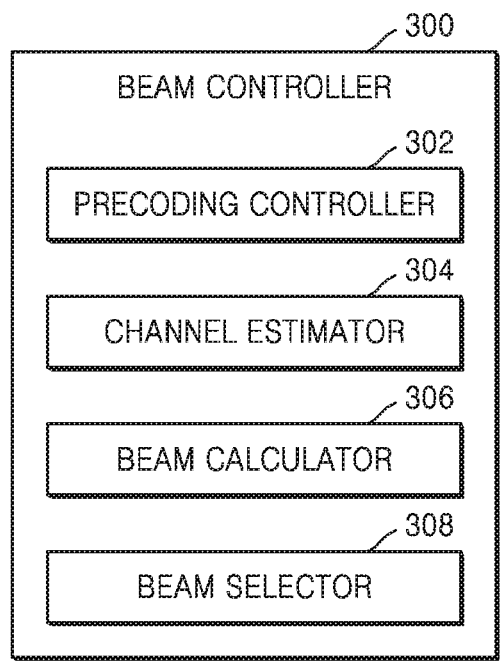
FIGS. 12A and 12B are block diagrams of examples of a beam controller, according to example embodiments.
Figure 12B:
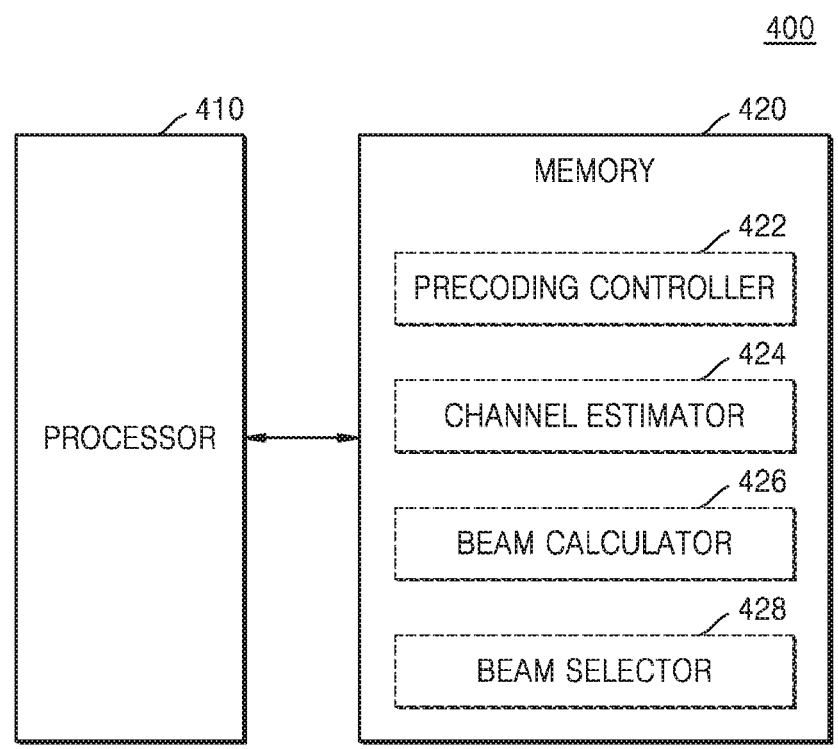

FIGS. 12A and 12B are block diagrams of examples of a beam controller, according to example embodiments. In detail, the block diagrams of FIGS. 12A and 12B show examples of the beam controller 184 in FIG. 1. As described above with reference to the drawings, a beam controller 300 of FIG. 12A and a beam controller 400 of FIG. 12B may perform at least one operation included in a wireless communication method according to an example embodiment. Hereinafter, redundant descriptions will be omitted.

Referring to FIG. 12A, the beam controller 300 may include a precoding controller 302, a channel estimator 304, a beam calculator 306, and a beam selector 308 as logic hardware components designed through logic synthesis. The precoding controller 302 may generate the control signal CTRL for controlling the precoder 140 according to a training beam matrix or a data beam matrix. In some embodiments, when the data processor 182 includes a digital precoder, the precoding controller 302 may control the digital precoder. The channel estimator 304 may estimate a channel based on signals received using at least one training beam in a beam training phase. For example, the channel estimator 304 may generate the channel matrix $\overline{H}_{comb}$, as described above with reference to Equations 8, 9, and 10.

The beam calculator 306 may calculate a data beam, i.e., a data beam matrix, based on the estimated channel and an objective function and may provide the data beam matrix to the precoding controller 302. The beam selector 308 may select at least one training beam from a plurality of training beams defined in a codebook. For example, the beam selector 308 may calculate similarities between the data beam and the training beams, select at least one training beam based on the similarities, and provide a training beam matrix corresponding to the selected training beam to the precoding controller 302.

Referring to FIG. 12B, the beam controller 400 may include a processor 410 and a memory 420. The processor 410 may be a central processing unit and may include at least one core, and the memory 420 may include a series of instructions or a program, each executed by the processor 410. As a non-limiting example, the memory 420 may include volatile memory, such as dynamic random access memory (DRAM) or static RAM (SRAM), or non-volatile memory, such as flash memory or electrically erasable programmable read-only memory (EEPROM). As shown in FIG. 12B, the memory 420 may include a precoding controller 422, a channel estimator 424, a beam calculator 426, and a beam selector 428 as software modules executed by the processor 410. The processor 410 may access the memory 420 and execute the software modules stored therein to perform operations respectively corresponding to the precoding controller 302, the channel estimator 304, the beam calculator 306, and the beam selector 308 in FIG. 12A by executing the precoding controller 422, the channel estimator 424, the beam calculator 426, and the beam selector 428.

In some embodiments, the beam controller 184 in FIG. 1 may be formed by combining logic hardware and a software module. For example, the beam controller 184 may include a precoding controller implemented by logic hardware, and a processor, and a memory including a channel estimator, a beam calculator, and a beam selector as software modules.

While the inventive concept has been particularly shown and described with reference to embodiments thereof, it will be understood that various changes in form and details may be made therein without departing from the spirit and scope of the following claims.

What is claimed is:

1. A wireless communication apparatus comprising:
   an antenna array;
   a transceiver configured to provide a signal to the antenna array to form a data beam and configured to process a signal received through the antenna array using the data beam; and
   a controller configured to calculate the data beam in a beam training phase and to control transmission according to the calculated data beam in a data transmission phase,
   wherein the controller is configured to estimate a channel using at least one first training beam and calculate the data beam from the at least one first training beam based on the estimated channel and based on an objective function corresponding to the estimated channel, in the beam training phase,
   wherein the controller is further configured to determine at least one second training beam to be used in a subsequent beam training phase following the data transmission phase, based on the calculated data beam.

2. The wireless communication apparatus of claim 1, wherein the objective function is based on at least one of a signal-to-noise ratio (SNR), a signal-to-interference plus noise ratio (SINK), a channel capacity, or an energy efficiency of the estimated channel.

3. The wireless communication apparatus of claim 1, wherein the controller is further configured to collect measured values generated from signals received using the at least one first training beam, the received signals being sequentially transmitted M times using a same transmission beam, and to generate a combined channel matrix based on the at least one first training beam and the measured values, where M is an integer greater than 1.

4. A wireless communication method in which beam training phases alternate with data transmission phases, the wireless communication method comprising:
estimating a first channel based on a signal received using at least one first training beam in a first beam training phase;
calculating, based on the estimated first channel and a first objective function corresponding to the estimated first channel, a first data beam for a first data transmission phase from the at least one first training beam in the first beam training phase, the first data transmission phase following the first beam training phase; and
determining at least one second training beam based on the first data beam in a second beam training phase following the first data transmission phase.

5. The wireless communication method of claim 4, wherein the estimating the first channel comprises:
collecting measured values generated from signals received using the at least one first training beam, the received signals being sequentially transmitted M times using a same transmission beam, where M is an integer greater than 1; and
generating a combined channel matrix based on the measured values and the at least one first training beam.

6. The wireless communication method of claim 5, further comprising:
obtaining a beamforming gain with respect to the first data beam in the first data transmission phase; and
generating, based on the beamforming gain, transmission data including information about an increase or a decrease of M in the first data transmission phase.

7. The wireless communication method of claim 4, wherein the first objective function is based on at least one of a signal-to-noise ratio (SNR), a signal-to-interference plus noise ratio (SINK), a channel capacity, or an energy efficiency of the estimated first channel.

8. The wireless communication method of claim 4, further comprising
selecting the at least one first training beam from training beams defined in a first codebook in the first beam training phase,
wherein the determining the at least one second training beam comprises selecting the at least one second training beam from training beams defined in a second codebook having a higher resolution than the training beams defined in the first codebook.

9. The wireless communication method of claim 4, further comprising:
selecting the at least one first training beam from training beams defined in a first codebook in the first beam training phase; and
obtaining a beamforming gain with respect to the first data beam in the first data transmission phase,
wherein the determining the at least one second training beam comprises:

selecting a codebook from the first codebook, a second codebook having a higher resolution than the first codebook, and a third codebook having a lower resolution than the first codebook, based on the beamforming gain; and
selecting the at least one second training beam from training beams defined in the selected codebook.

10. The wireless communication method of claim 4, wherein the determining the at least one second training beam comprises selecting the at least one second training beam based on an error and/or a correlation between the first data beam and the at least one second training beam.

11. The wireless communication method of claim 4, wherein the at least one second training beam comprises training beams respectively having patterns at least partially overlapping each other.

12. The wireless communication method of claim 4, further comprising:
estimating a second channel based on a signal received using the at least one second training beam in the second beam training phase; and
calculating, based on the estimated second channel and a second objective function corresponding to the estimated second channel, a second data beam for a second data transmission phase from the at least one second training beam in the second beam training phase, the second data transmission phase following the second beam training phase.

13. A wireless communication method in which beam training phases alternate with data transmission phases, the wireless communication method comprising:
calculating a first data beam for a first data transmission phase from at least one first training beam in a first beam training phase, the first data transmission phase following the first beam training phase;
determining at least one second training beam based on the first data beam in a second beam training phase following the first data transmission phase; and
calculating a second data beam for a second data transmission phase from the at least one second training beam in the second beam training phase, the second data transmission phase following the second beam training phase.

14. The wireless communication method of claim 13, further comprising
selecting the at least one first training beam from training beams defined in a first codebook in the first beam training phase,
wherein the determining the at least one second training beam comprises selecting the at least one second training beam from training beams defined in a second codebook having a higher resolution than training beams defined in the first codebook.

15. The wireless communication method of claim 13, wherein the determining the at least one second training beam comprises selecting the at least one second training beam based on an error and/or a correlation between the first data beam and the at least one second training beam.

16. The wireless communication method of claim 13, wherein the at least one second training beam comprises training beams respectively having patterns at least partially overlapping each other.

17. The wireless communication method of claim 13, further comprising estimating a channel based on a signal received using the at least one first training beam in the first beam training phase, wherein the calculating the first data beam comprises calculating the first data beam based on the estimated channel and an objective function corresponding to the estimated channel.

18. The wireless communication method of claim 17, wherein the estimating of the channel comprises:

collecting measured values generated from signals received using the at least one first training beam, the received signals being sequentially transmitted M times using a same transmission beam, where M is an integer greater than 1; and generating a combined channel matrix based on the measured values and the at least one first training beam.

* * * * *